(12) United States Patent
Ebina

(10) Patent No.: US 6,994,900 B2
(45) Date of Patent: Feb. 7, 2006

(54) OPTICAL DISK AND METHOD FOR MANUFACTURING DISK SUBSTRATE FOR OPTICAL DISK

(75) Inventor: Toshiyuki Ebina, Aichi-ken (JP)

(73) Assignee: Kabushiki Kaisha Meiki Seisakusho, Aichi-ken (JP)

(*) Notice: Subject to any disclaimer, the term of this patent is extended or adjusted under 35 U.S.C. 154(b) by 0 days.

(21) Appl. No.: 10/876,018

(22) Filed: Jun. 25, 2004

(65) Prior Publication Data

US 2005/0042405 A1    Feb. 24, 2005

(30) Foreign Application Priority Data

Aug. 21, 2003  (JP) ............................ 2003-297468

(51) Int. Cl.
*B32B 3/02*    (2006.01)
(52) U.S. Cl. .................. 428/64.1; 428/64.4; 428/65.2; 430/270.11
(58) Field of Classification Search .............. 428/64.1, 428/64.4, 64.5; 430/270.11
See application file for complete search history.

(56) References Cited

U.S. PATENT DOCUMENTS

| | | | |
|---|---|---|---|
| 5,618,634 A * | 4/1997 | Hosoda et al. ............... | 428/610 |
| 5,827,593 A * | 10/1998 | Maruyama et al. ......... | 428/64.1 |
| 6,169,721 B1 * | 1/2001 | Takishita et al. ......... | 369/275.4 |
| 6,815,029 B2 * | 11/2004 | Kawaguchi et al. ....... | 428/64.1 |

FOREIGN PATENT DOCUMENTS

| | | |
|---|---|---|
| JP | 09-223333 | 8/1997 |
| JP | 10-296797 | 11/1998 |
| JP | 11-120618 | 4/1999 |
| JP | 2000-242974 | 9/2000 |

* cited by examiner

*Primary Examiner*—Elizabeth Mulvaney
(74) *Attorney, Agent, or Firm*—Browdy and Neimark

(57) ABSTRACT

To improve a bad appearance due to an interconnection between a pair of disk substrates (20, 30) which are bonded with annular grooves (25, 35) being opposed to each other by a simple structure and at a low cost, which have annular grooves (25, 35) near their center openings (15), an outer groove end (26) of the annular groove (25) of one disk substrate (20) in the radial direction is registered in position with an outer end (36) of the annular groove (35) of the other disk substrate (30) and inner groove ends (27, 37) of the annular grooves in the radial direction are located in different positions. The annular grooves have different groove widths A, B.

4 Claims, 7 Drawing Sheets

OPTICAL DISK AND METHOD FOR MANUFACTURING DISK SUBSTRATE FOR OPTICAL DISK

BACKGROUND OF THE INVENTION

1. Field of the Invention

The present invention relates to an optical disk and a method for manufacturing a disk substrate for an optical disk. In particular, the present invention relates to an optical disk and a method for manufacturing a disk substrate, for an optical disk in which a bonded portion exhibits a good appearance.

2. Description of the Related Art

As shown in FIGS. 6 and 7, a known bonded optical disk 100 such as a DVD (Digital Versatile Disk) is made by bonding a pair of disk substrates 110, 120 by an adhesive 101, with information recording areas 112 and 122 opposed to each other.

The information recording areas 112, 122 are produced by imprinting, using disk substrate molding stampers. The stamper is held on a movable mirror-surfaced plate by an inner peripheral stamper holder. On the surface of each information recording area 112, 122 of the disk substrates 110, 120, annular grooves 115, 125 are formed by projections of the inner peripheral stamper holder. A pair of disk substrates 110, 120 are formed in the same mold using interchangeable different stampers, or in different molds having different stampers of different pieces of information. In either case, as the same inner peripheral stamper holder is used the annular grooves 115, 125 formed on the pair of the substrates 110, 120 are identical in shape and size. Numeral 105 in the drawings represents a center opening of the optical disk 100.

As described in Kokai (Japanese Unexamined Patent Publication) No. 11-120618, when the disks are bonded with the annular grooves 115 and 125 being opposed and registered, a leakage liquid 102 occurs or an air bubble 103 is produced. The leakage liquid 102 shown in FIG. 6 takes place, for example, when in an adhesive spreading apparatus, a position where the adhesive is applied in a doughnut shape to the lower disk substrate 120 is located on the outside of the annular groove 125 in the radial direction and comparatively close thereto, or when a suction force from the rotation axis side is too large compared with a centrifugal force to spread the applied adhesive. The air bubble 103 shown in FIG. 7 is produced, for example, when a position where the adhesive is applied in doughnut shape to the lower disk substrate 120 is located on the outside of the annular groove 125 in the radial direction and comparatively far away therefrom or when a suction force from the rotation axis side is small, compared with the centrifugal force to spread the applied adhesive. The leakage liquid 102 and the air bubble 103 are present on transparent portions of the disks which are located on inner sides of the information recording areas 112, 122 in the radial direction and which are not subject to vapor deposition of a thin film or printing. Therefore, the leakage liquid and the bubble make the appearance of the disk bad and may reduce the adhesive force between the disc substrates 110 and 120.

A solving technology to prevent the leakage liquid 102 or the air bubble 103 mentioned above is described in Kokai (Japanese Unexamined Patent Publication) No. 11-120618. In the technology disclosed in Kokai No. 11-120618, a liquid stopping groove is provided on a disk substrate which constitutes an optical disk. The liquid stopping groove has a plurality of steps having different depths. The depth of the steps become deeper as the distance from the center of the disk is decreased, and the inside wall of each step is tapered. However, in the technology described in Kokai No. 11-120618, the manufacturing cost is high because it is necessary to provide plural steps in the liquid stopping groove, thus leading to difficulty in production of a mold.

BRIEF SUMMARY OF THE INVENTION

The present invention has been completed to eliminate the drawbacks of the prior art as mentioned above by providing an optical disk and a method for forming a disk substrate for an optical disk in which the apparatus of the disk which would be otherwise made bad at the interconnection between the disk substrates can be made simply at a low cost. In this invention, there is provided an optical disk comprised of a pair of disk substrates which have, in the vicinity of their center openings, annular grooves and which are bonded to each other with the annular grooves being opposed to each other, wherein the annular groove of one of the disk substrate and the annular groove of the other disk substrate are constructed so that the positions of the annular grooves concur with each other at outer ends thereof in the radial direction and are different from one another at inner ends in the radial direction, said annular grooves having different groove widths.

DETAILED DESCRIPTION OF THE INVENTION

Figure 1:
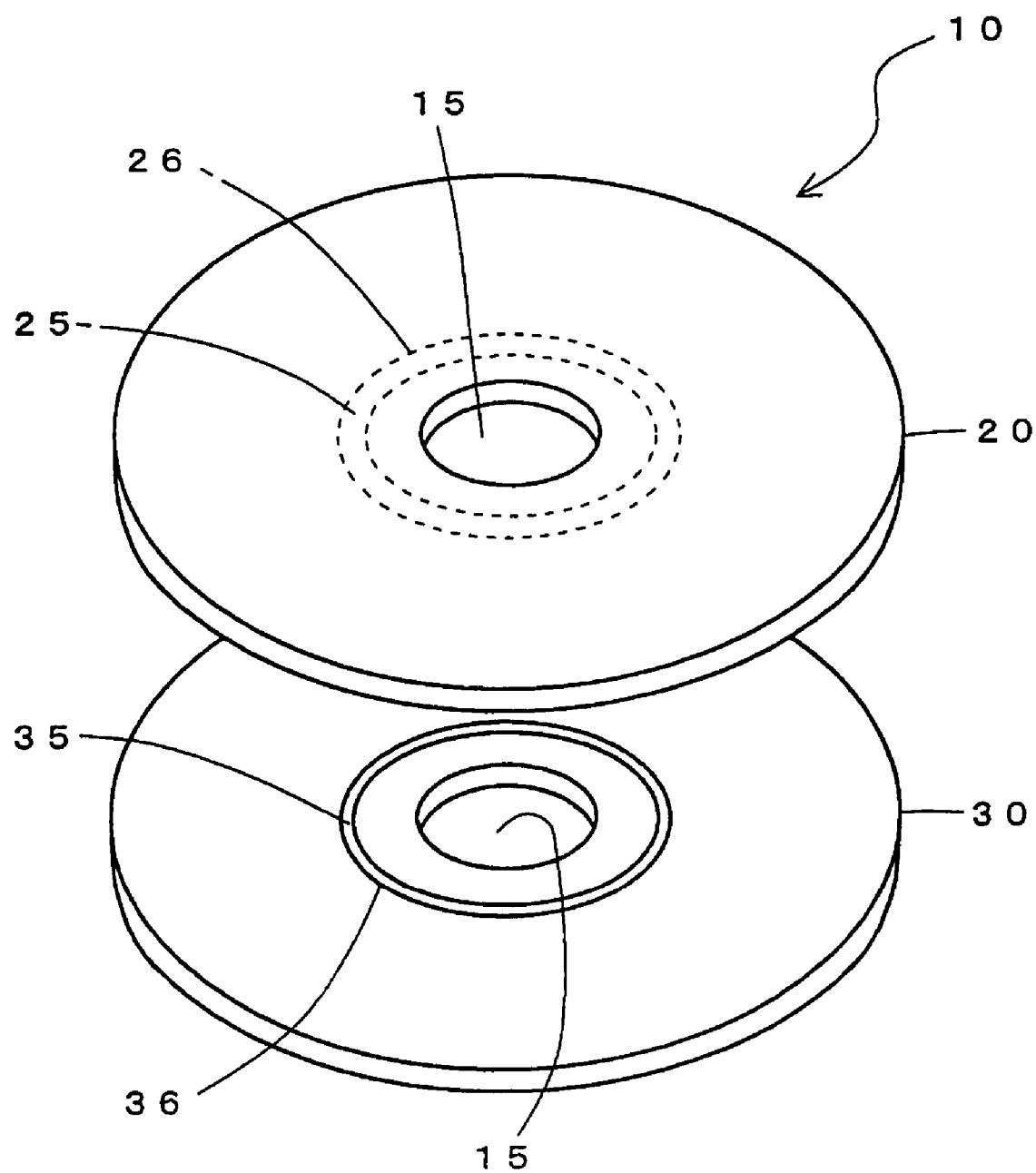
FIG. 1 is an exploded perspective view of an optical disk of an embodiment of the present invention.
Figure 2:
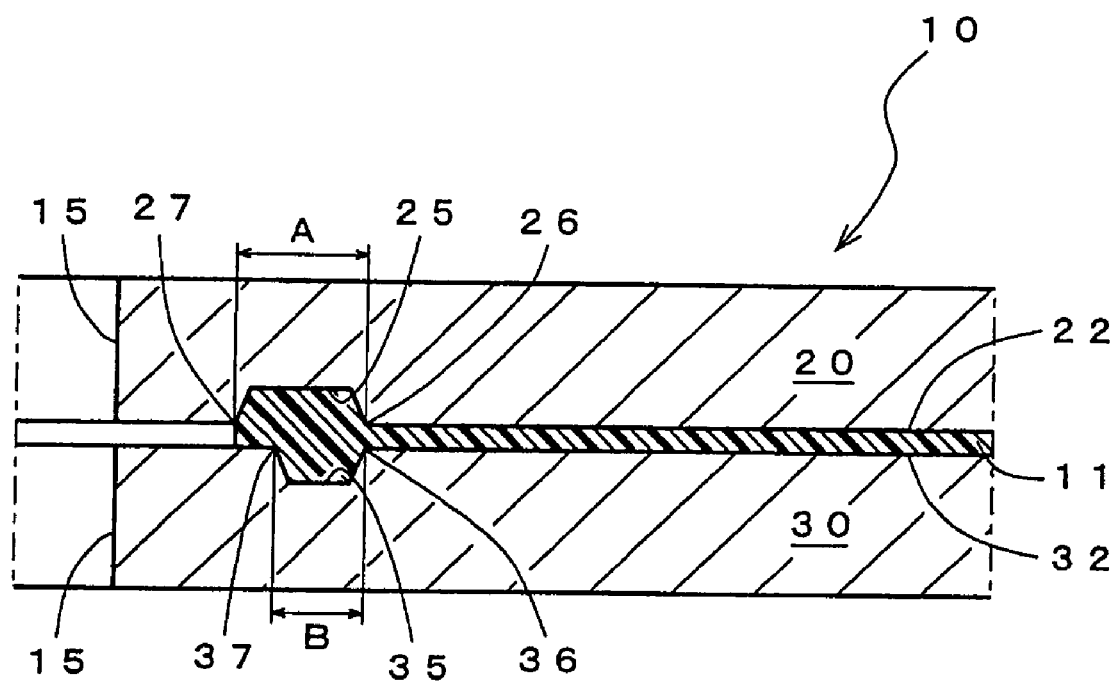
FIG. 2 is a longitudinal sectional view of a main part of an optical disk of an embodiment of the present invention.
Figure 3:
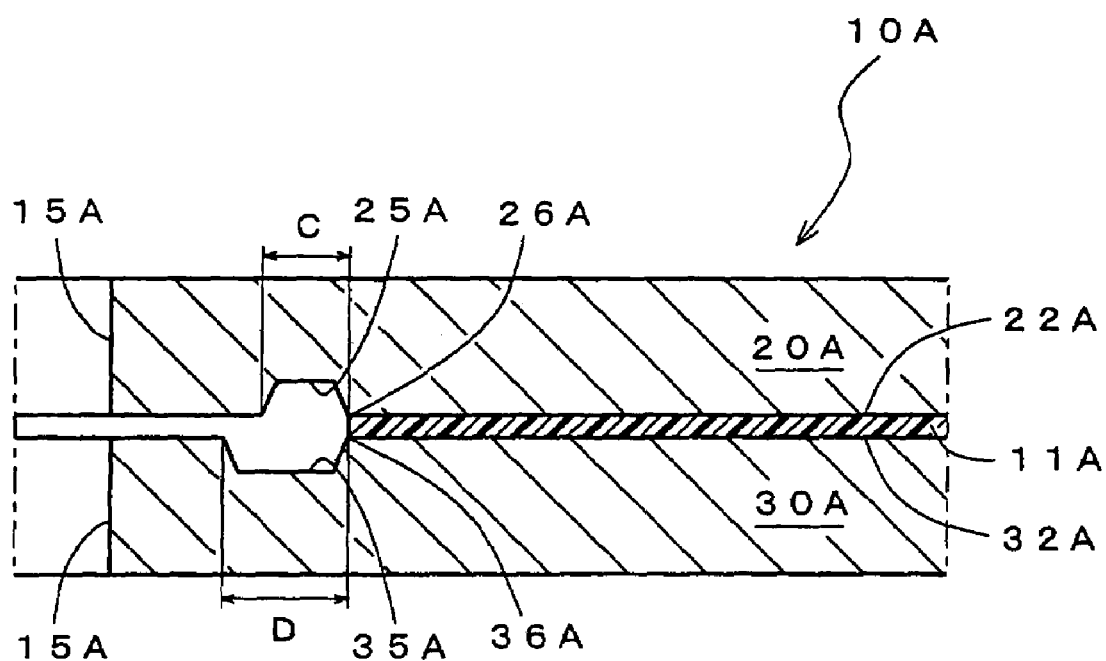
FIG. 3 is a longitudinal sectional view of a main part of another optical disk of an embodiment of the present invention.

An optical disk 10 is, as shown in FIGS. 1 to 3, made of a pair of disk substrates 20 and 30 which are provided with annular grooves 25, 35 near central openings 15 and which are bonded with the annular grooves 25, 35 being opposed to each other. In the optical disk 10, as shown in FIG. 2, the annular grooves 25 and 35 of the disk substrates 20 and 30 concur in the position of the outer groove ends 26, 36 thereof in the radial direction but are different in the position of the inner groove ends 27, 37 in the radial direction, so that the annular grooves 25, 35 have different widths. In the optical disk 10 of an embodiment shown in FIG. 2, the groove width A of the annular groove 25 is larger than the groove width B of the annular groove 35. In an optical disk 10A in an embodiment shown in FIG. 3, the annular groove 35A of the disk substrate 30A has a larger groove width D than the groove width C of the annular groove 25A of the disk substrate 20A. As shown in the drawings, the vicinity of the central openings 15 refers to an area spaced from the central opening 15 by a predetermined distance outwardly in the radial direction of the optical disk 10 (10A).

The groove widths of the annular grooves of the disk substrates are in the range of 1.5 mm to 5.5 mm. The optical disk 10 (10A) shown in FIG. 2 and 3 is made of disk substrates, in combination, having the annular grooves 25 (25A) and 35 (35A) whose groove widths A, B, C and D are 1.60 mm, 2.54 mm and 5.20 mm.

Figure 4:
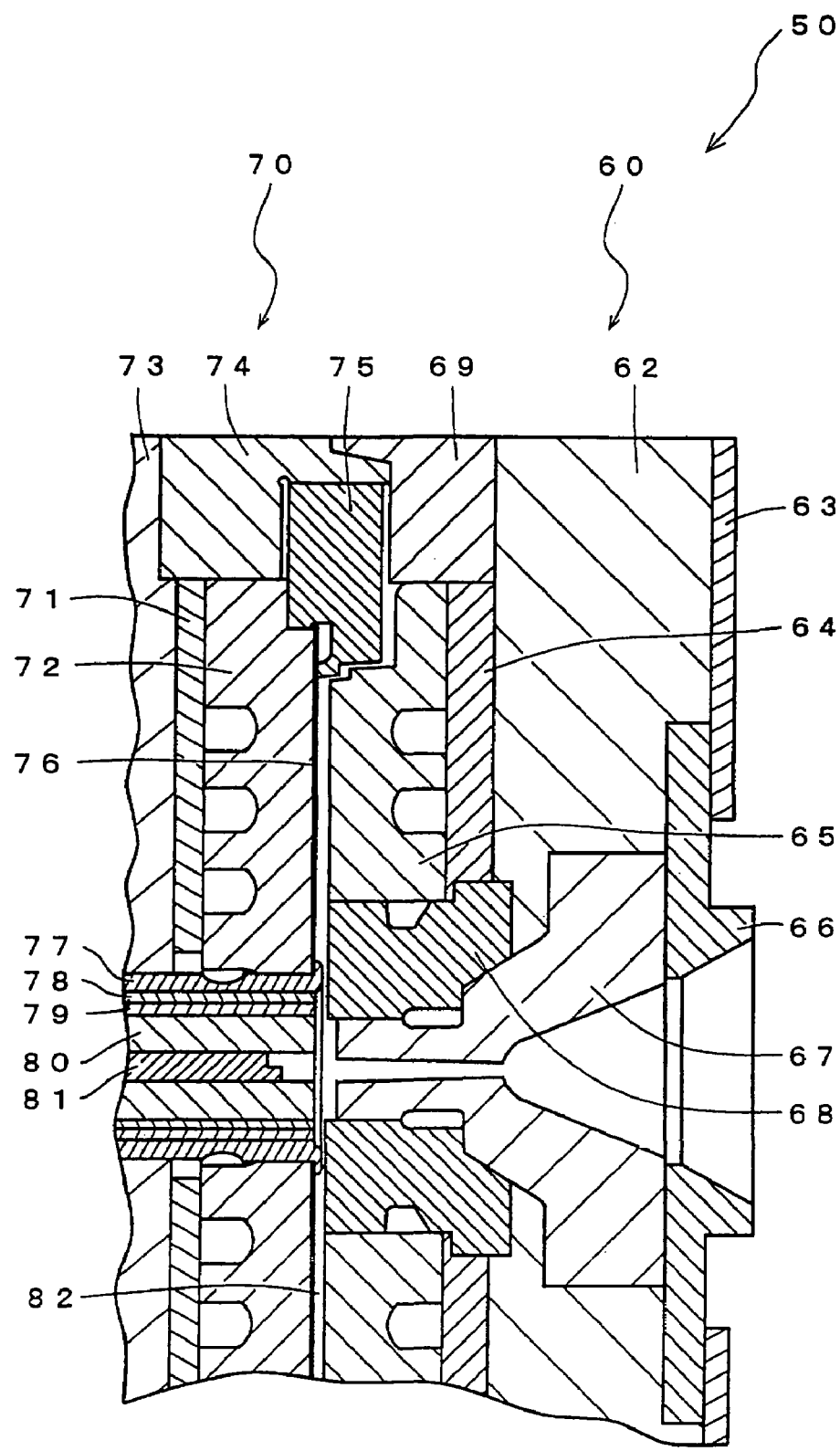
FIG. 4 is a longitudinal sectional view of a mold for forming a disk substrate to work an embodiment of the present invention.
Figure 5:
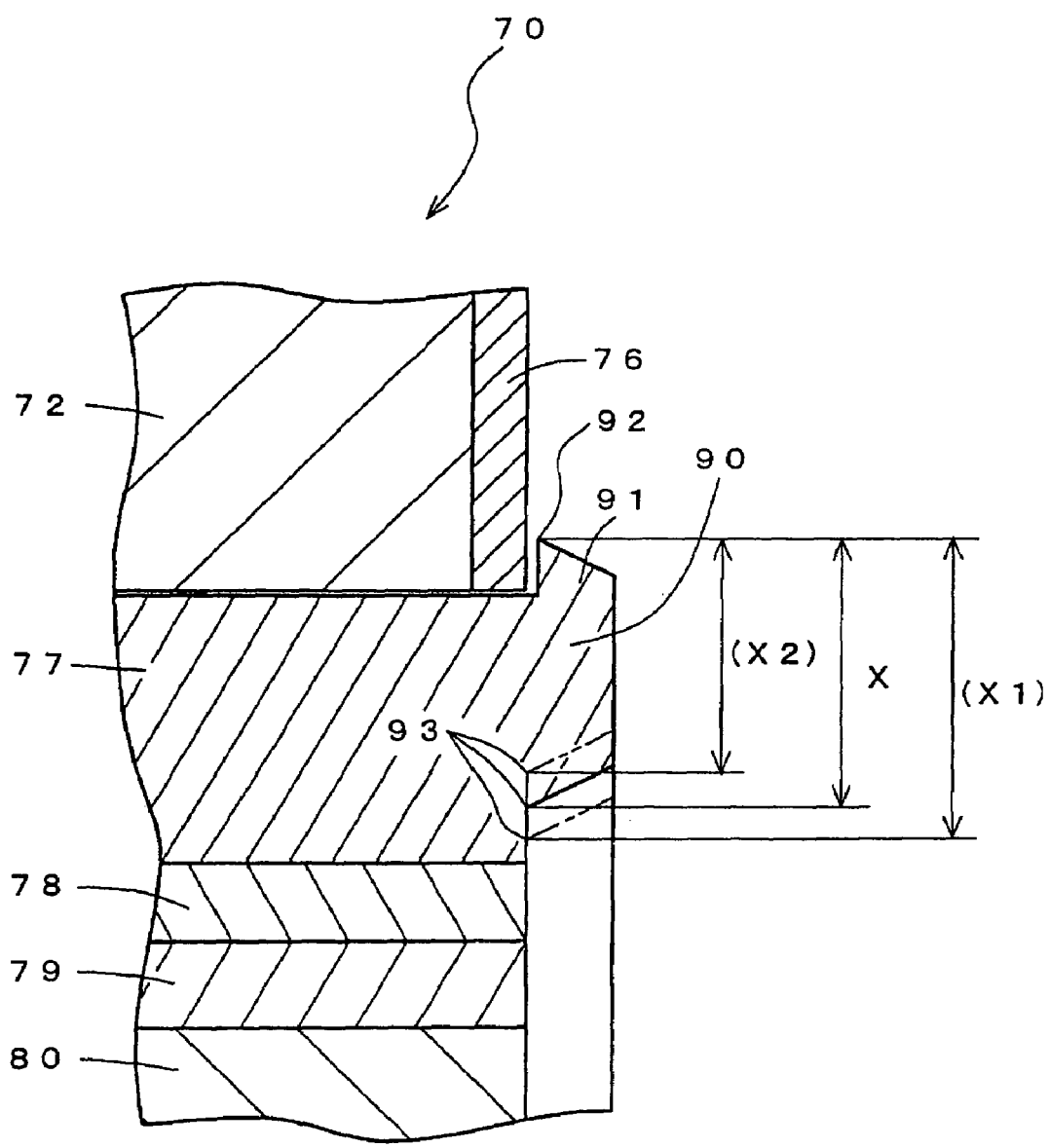
FIG. 5 is an enlarged sectional view of a portion of a mold for forming a disk substrate in the vicinity of an inner peripheral stamper holder.
Figure 6:
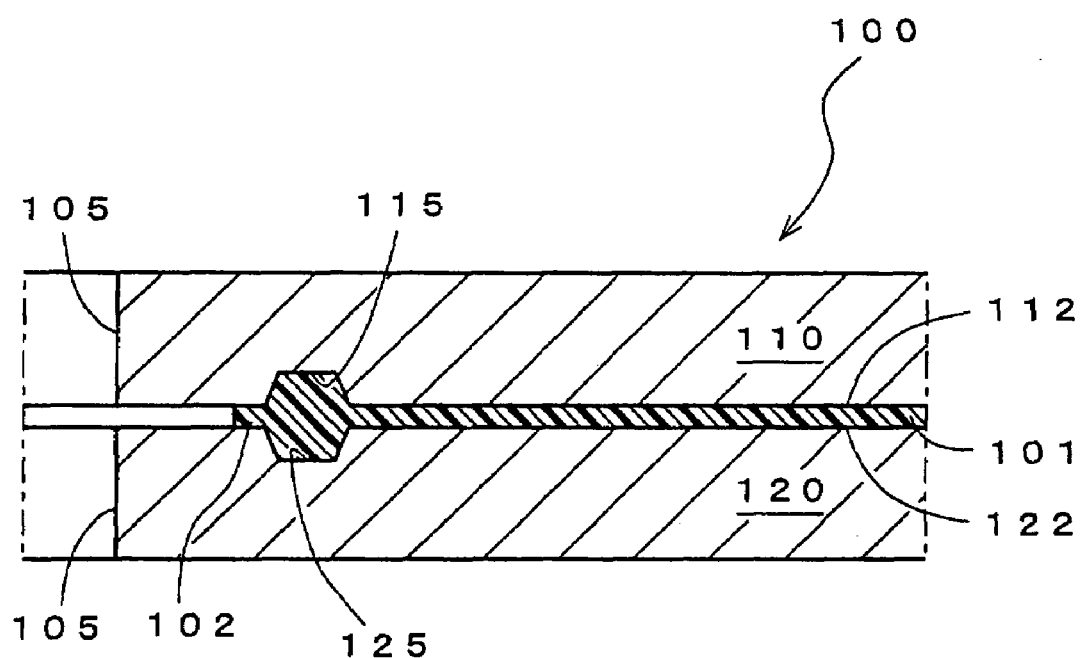
FIG. 6 is a longitudinal sectional view of a main part of a conventional optical disk.
Figure 7:
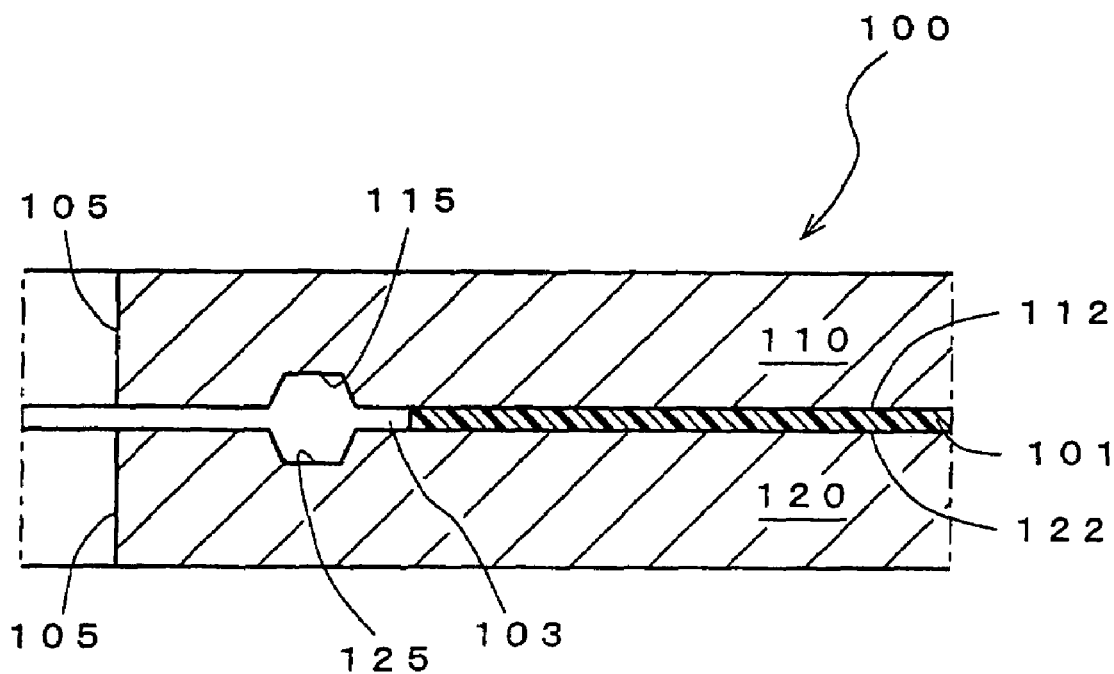
FIG. 7 is a longitudinal sectional view of a main part of another known optical disk.

When a pair of disk substrates 20, 30 are individually formed, as shown in FIGS. 4 and 5, the annular grooves 25, 35, etc., are formed by annular projection 90 projecting in a mold cavity to form the disk substrate 20 or, 30, etc. The annular projection to form the annular groove 25 (25A) of the disk substrate 20 (20A) and the annular projection to form the annular groove 35 (35A) of the other disk substrate 30 (30A) are identical in the position of the outer ends 92 in the radial direction and are different in the position of the inner ends 93 in the radial direction within the mold cavity 82.

As shown in an embodiment of FIG. 5, movable molds 70 have annular projections 90 having different widths X, X1 and X2. The annular projections 90 are identical in the position of the outer ends 92 and are different in the position of the inner ends 93. For example, when a pair of disk substrates 20, 30 shown in FIG. 2 are formed, the annular groove 25 and 35 are formed using the annular projections 90 having the projection widths X and X2, respectively. On the other hand, when a pair of disk substrates 20A, 30A shown in FIG. 3 are formed, for example, the annular grooves 25A and 35A are formed using the annular projections 90 having the projection widths X2 and X1, respectively.

The annular projection 90 is provided on an inner peripheral stamper holder 77, as shown in FIGS. 4 and 5. Because the annular projection is formed by the inner peripheral stamper holder, it is not necessary to separately provide an annular projection to form the annular groove and hence it is possible to easily prevent the disk having a bad appearance when the disk substrates are bonded at a low cost. The inner peripheral stamper holder 77 is detachable because it must be frequently exchanged together with a stamper 76 which constitutes the movable mold 70. In the movable mold 70 of the illustrated embodiment, the inner peripheral stamper holder 77 can be replaced by one having an annular projection of a different projection width X, etc.

Next, a method to manufacture the disk substrate 20 or 30 will be explained. A mold 50 shown in FIG. 4 is comprised of the fixed mold 60 and the movable mold 70. The fixed mold 60 is comprised of a fixed mold plate 62 which is attached to a fixed platen of an injection molding machine (not shown) via an insulation plate 63, a fixed mirror-surfaced plate 65 secured to the surface of the fixed mold plate 62 opposite to the insulation plate, a female cutter 68 inserted and fitted in the center holes of the fixed mold plate 62, a fixed counter plate 64 and the fixed mirror-surfaced plate 65, a sprue bush 67 inserted and fitted in center holes of the female cutter 68 and the fixed mold plate 62, a positioning plate 66 abutting against an edge surface of the sprue bush 67 and secured to the center hole of the fixed mold plate 62 and, a fixed outer peripheral ring 69 inserted and fitted on the outer edge surface of the fixed counter plate 64 and the fixed mirror-surfaced plate 65 and secured to the fixed mold plate 62.

The movable mold 70 is comprised of a movable mold plate 73, a movable mirror-surfaced plate 72 fixed to a surface of the movable mold plate 73, on the fixed mold 60 side via a movable counter plate 71, the stamper 76 on which the movable mirror-surfaced plate 72 is provided on the surface opposite to the fixed mirror-surfaced plate 65, an outer peripheral stamper holder 75 to hold an outer end portion of the stamper 76 on the movable mirror-surfaced plate 72, the inner peripheral stamper holder 77 as a supporting member, which is loosely inserted in the center holes of the counter plate 71 and the movable mirror-surfaced plate 72 to hold an inner end portion of the stamper 76 on the movable mirror-surfaced plate 72, a fixed sleeve 78 which guides an inner hole of the inner peripheral stamper holder 77 and is secured to the movable mold plate 73, an ejector 79 which is inserted and fitted in an inner hole of the fixed sleeve 78 to slide in the axial direction, a male cutter 80 which is inserted and fitted in an inner hole of the ejector 79 to slide in the axial direction, an ejector pin 81 which is inserted and fitted in an inner hole of the male cutter 80 and is slidable in the axial direction, and, a movable outer peripheral ring 74 which is fitted on the movable mold plate 73 and the outer edge surface of the movable mirror-surfaced plate 72 and is secured to the movable mold plate 73. The fixed mold 60 and the movable mold 70 form the mold cavity 82 when the fixed outer peripheral ring 69 is registered with and abuts against the movable outer peripheral ring 74.

The stamper 76 is made of a thin plate having a center opening and holds information represented by pits in the order of submicrons and formed on one side. The inner peripheral stamper holder 77, as shown in FIG. 5, is provided with the annular projection 90 on which a flange 91 is formed to hold the inner peripheral of the stamper 76 between the flange 91 and the movable mirror-surfaced plate 72. As the annular projection 90 is integrally formed with the inner peripheral stamper holder 77, it is not necessary to provide separate annular projection to form the annular grooves 23, 35, and thus, the problem that the appearance is bad due to interconnection between the disk substrates 20, 30 can be easily eliminated at a low cost. The annular projection 90 is substantially trapezoidal or semicircular in section, and the projection widths X, etc., which correspond to the size of the bottom surface, are set at predetermined values corresponding to the disk substrates 20, 30. Consequently, neither the leakage liquid 102 nor the air bubble 103 occurs when the pair of formed disk substrates 20, 30 are bonded. The pair of the disk substrates 20, 30 are formed using one mold by exchanging the stamper 76 or are formed using different molds having different stampers 76 with different pieces of information.

An injection device of an injection molding machine (not shown) injects and fills molten resin material through the sprue bush 67 into the mold cavity 82. The mold cavity 82 is structured to form the disk substrates 20 and 30. Namely, first surfaces of the disk substrates are formed by the stamper 76, the inner peripheral stamper holder 77, the fixed sleeve 78 and the ejector 79, and the other surfaces of the disk substrates 20 and 30 are formed by the fixed mirror-surfaced plate 65 and the female cutter 68. The outer peripheral surfaces of the disk substrates 20 and 30 is formed by the outer peripheral stamper holder 75. The melted resin injected and filled in the mold cavity 82 is cooled and hardened because the temperature of the mold cavity 82 is controlled to be lower than the melted resin by a coolant. When the male cutter 80 is moved forward and is engaged with the female cutter 68, the disk substrates 20, 30 are pierced to form the central openings 15, 15A (see FIGS. 1 to 3). The disk substrates 20, 30 on which the central openings 15 are removed from the mold by the forward movement of the ejector 79 after the movable mold 70 is released from the fixed mold 60. A sprue produced when the central openings 15 are formed and remaining at the center of the mold 50 is removed by projecting the ejector pin 81 after the movable mold 70 is released from the fixed mold 60.

The disk substrate 20 molded as above is a circular disk having the central opening 15 and having a thickness of 0.6 mm and a diameter of 120 mm, as shown in FIGS. 1 and 2. On one side (first surface) of the disk substrate 20, the annular groove 25 is provided whose outer groove end 26 is located substantially at the diameter of 22.2 mm. The information recording area 22 is formed by transferring at a predetermined distance from the outer groove end 26 outwardly in the radial direction. The disk substrate 30 molded as above is a circular disk having the central opening 15 and having a thickness of 0.6 mm and diameter of 120 mm, as shown in FIGS. 1 and 2. On one side of the disk substrate 30, the annular groove 35 is provided whose outer groove end 36 is located approximately at a diameter of 22.2 mm. The information recording area 32 is formed by transferring at a predetermined distance from the outer groove end 36 outwardly in the radial direction. The information recording area 22 (32) may not be transferred on one of the disk substrates 20, 30.

On the information recording areas 22, 32 on the shaped disk substrates 20, 30, reflection coatings are provided by applying a metal such as aluminum by sputtering or vacuum deposition. After that, an ultraviolet-setting curing resin is applied to the surface of the reflection coatings by a spin coater or the like, and ultraviolet light is irradiated so that a protection films, against scratch or corrosion, are formed. Thus, the pair of disk substrates 20, 30 to be bonded are formed.

To bond the disk substrates 20 and 30, or disk substrates 20A and 30A, as shown in FIG. 9 of Kokai (Japanese Unexamined Patent Publication) No. 11-120618, generally an adhesive spreading device is used in which an adhesive is spread due to a centrifugal force by rotation. FIG. 2 shows the spread adhesive 11 when the position where the adhesive 11 is applied in a doughnut shape is comparatively close to and in the outside of the outer groove end 36 of the annular groove of the disk substrate 30 which is mounted at the lower portion of the spreading device, in the radial direction or when a suction force from the rotation axis side is too large, compared with the centrifugal force to spread the applied adhesive 11. On the other hand, FIG. 3 shows the spread adhesive 11A when the position where the adhesive 11A is applied in doughnut shape is comparatively distant from the outer groove end 36A of the annular groove of the disk substrate 30A which is mounted at a lower portion of the spreading device, outwardly in the radial direction, or when the suction force from the rotation axis side is small, compared with the centrifugal force to spread the applied adhesive 11A. As can be seen from FIG. 2 and FIG. 3, when a pair of disk substrates 20, 30 having annular grooves 25, 35 of different widths are bonded using the adhesive spreading device, the outer groove ends 26A, 36A or the inner groove end 27 can certainly stop liquid such as the adhesive 11A, and therefore, no leakage liquid 102 takes place and no air bubble 103 is produced. This mode of operation is obtained regardless of a dimensional difference of the groove widths, and is obtained also when the groove width of any one of the upper and lower disk substrate is larger than that of the other disk substrate. Thus, an optical disk 10 of a good appearance can be produced. FIG. 2 and FIG. 3 show examples of the upper and lower disk substrates having different groove widths A, B, etc. in combination and show how the flow of the adhesive 11 is stopped. The combination of the upper and lower disk substrates is not limited to those shown in the drawings.

TABLE 1

| Kind of disk substrate | External diameter of annular projection 90 [mm] | Internal diameter of annular projection 90 [mm] | Projection width [mm] |
|---|---|---|---|
| a | 22.20 | 20.60 | 1.60 |
| b | 22.20 | 19.66 | 2.54 |
| c | 22.20 | 17.00 | 5.20 |

Table 1. shows concrete values of the external and internal diameters of the annular projections 90 and the projection widths of the disk substrates "a" to c produced by a mold provided with the inner peripheral stamper holders having three different (large, medium and small) projection widths. The values of the projection widths, etc., in Table 1 are those of the molds and not those of the disk substrates. In connection with the groove widths of the disk substrates, it should be considered that the values of the projection widths can vary around 10% at the maximum because of deformation due to contraction of the melted resin, reduction in transference of the melted resin at the annular groove ends and difficulty of measuring at the portions. Moreover, the positions of the outer groove ends 26, etc., are difficult to modify, without departing from the standard of an optical disk, and the maximum value of the projection width is limited from the viewpoint of the mold structure. Furthermore, the maximum value and the minimum value of the projection width are also limited due to the flowability of the melted resin. Considering these limitations, the groove widths of the annular grooves are set in the range from 1.5 mm to 5.5 mm. Because the groove widths of the annular grooves are in the range of 1.5 mm to 5.5 mm, the mold for forming the annular grooves can be easily produced and the adhesive can be certainly stopped and, hence, neither leakage liquid nor an air bubble is produced. Consequently, an optical disk of good appearance can be produced. The groove widths of the annular grooves 25, 35, etc, of the pair of the disk substrates 20, 30 are determined to have appropriate differences within the above range. This makes it easy to produce the mold 50 for the annular grooves 25, 35, etc, the movement of the adhesive 11 can be successfully stopped and, the disk is free from leakage liquid 102 or the air bubble 103, thus leading to, therefore, an optical disk 10 having a good appearance. The heights of the annular projections 90 is from 0.15 mm to 0.25 mm.

TABLE 2

| Combination and kinds of disk substrates | Result obtained from bonding disk substrates (presence or absence of air bubble) |
|---|---|
| a—a | no good (presence of air bubble) |
| a–b (FIG. 2) | OK (no air bubble) |
| a–c (FIG. 2) | OK (no air bubble) |
| b–a (FIG. 3) | OK (no air bubble) |
| b—b | no good (presence of air bubble) |
| b–c (FIG. 2) | OK (no air bubble) |
| c–b (FIG. 3) | OK (no air bubble) |
| c—c | no good (presence of air bubble) |

Table 2. shows the result of presence or absence of an air bubble by an eye view, for the cemented disk substrates "a", b, c in Table. 1 in combination.

The present invention can be changed, modified or improved based on the knowledge of an artisan. Moreover, it is obvious that alternative embodiments of the present invention as changed, modified or improved without departing from the spirit of the invention are included in the scope of claims of the present invention.

For example, in the mold 50 in the embodiment of the present invention discussed above, the stamper 76 is provided on the movable mirror-surfaced plate 72. However, it is possible to provide the stamper 76 on the fixed mirror-surfaced plate and provide the inner peripheral stamper holder on the female cutter portion. Moreover, the annular grooves 25, 35 or 25A, 35A are not limited to those formed by the annular projections 90 of the inner peripheral stamper holder 77 and can be those formed by the annular projections which are provided separately from the inner peripheral stamper holder 77. Also, the invention can be applied to a mold having a plurality of mold cavities defined between the fixed mold and the movable mold.

What is claimed is:

1. An optical disk comprised of a pair of disk substrates which have, in the vicinity of their center openings, annular grooves and which are bonded to each other with the annular grooves being opposed to each other, wherein the annular groove of one of the disk substrate and the annular groove of the other disk substrate are constructed so that the positions of the annular grooves concur with each other at outer groove ends thereof in the radial direction and are different from one another at inner groove ends in the radial direction, said annular grooves having different groove widths.

2. An optical disk according to claim 1 in which the groove width of each annular groove is in the range of 1.5 mm to 5.5 mm.

3. A method for producing a pair of disk substrates which have annular grooves in the vicinity of center openings thereof and which are bonded with the grooves being opposed to each other, wherein the annular grooves are each formed by an annular projection projecting in a mold cavity for molding each of the pair of disk substrates, and the annular projection for forming the annular groove of one of the disk substrates and the annular projection for forming the annular groove of the other disk substrate form the respective annular grooves so that outer groove ends of the annular grooves in the radial direction in the mold cavity are identical in position and inner groove ends of the annular grooves in the radial direction are different in position.

4. A method for producing a pair of disk substrates for an optical disk according to claim 3, in which the annular projection is provided on an inner peripheral stamper holder.

* * * * *